Dec. 13, 1949   R. T. PALMER   2,490,979
ELECTROSTATIC PRECIPITATOR
Filed June 28, 1947.   2 Sheets-Sheet 1

INVENTOR
Robert T. Palmer
By Robert T. Palmer
Attorney

Dec. 13, 1949  R. T. PALMER  2,490,979
ELECTROSTATIC PRECIPITATOR
Filed June 28, 1947  2 Sheets-Sheet 2

INVENTOR
Robert T. Palmer
By Robert T. Palmer
Attorney

Patented Dec. 13, 1949

2,490,979

UNITED STATES PATENT OFFICE 2,490,979

ELECTROSTATIC PRECIPITATOR

Robert T. Palmer, Sharon, Mass., assignor to Westinghouse Electric Corporation, East Pittsburgh, Pa., a corporation of Pennsylvania Application June 28, 1947, Serial No. 757,895

4 Claims. (Cl. 183—7)

This invention relates to electrostatic precipitators for the removal of small, foreign particles, such as dust, from gases such as air.

The most successful electrostatic dust collectors have ionizer chambers in which the dust and other small foreign particles entrained in a gas are electrostatically charged, followed by collector chambers containing oppositely charged, metal collector electrodes usually in the forms of plates. The electrostatically charged dust particles are repelled in the collector chambers by the collector plates having the same polarity, and are attracted to the collector plates having the opposite polarity. In collectors having dry collector plates as distinguished from oil coated ones, the charged particles striking the oppositely charged collector plates, adhere thereto until they lose their charges, by electrostatic attraction, although with certain types of dust and with certain gases, including air, moisture and/or chemicals cause the dust to adhere to the plates to which they are attracted, after the dust has lost its electrostatic charge. The dust coated plates have to be cleaned after a period of use, and one cleaning method that has been widely used involves washing down the collector plates with water. This method requires water and drain connections which, in some locations, it is inconvenient to supply.

This invention provides an electrostatic precipitator in which the metal collector electrodes are coated with electric insulation whereby the dust attracted to the electrodes, requires a much longer period of time before it loses its charge, than where the dust contacts metal electrodes. Dampers are provided in the gas inlet and gas outlet of the precipitator, and a hopper is provided below the electrodes in the collector, the interior of the hopper being connected to the inlet of a motor driven, suction fan. Provision is made for reversing the polarity of the charged, coated, collector electrodes.

After a period of use when the electrodes need cleaning, a control switch is closed which energizes motors to close the inlet and outlet dampers; which starts the motor of the suction fan, and which causes periodic reversal of the polarity of the collector electrodes. The dust adhering through electrostatic attraction to the coated electrodes, is then repelled thereby towards the oppositely charged electrodes, but before it can strike same it is pulled by the suction of the fan into same, and blown to a point of disposal. The polarity of the collector electrodes can be reversed frequently during the cleaning period for causing any dust which has traversed the space between the oppositely charged electrodes, to reenter the spaces therebetween thereby increasing its chance of being drawn into the fan. A mechanical rapper can be added to aid in the dislodgment of the dust from the electrodes where chemical or mechanical adherence resists the electrostatic action.

An object of the invention is to provide an improved method of cleaning the electrodes of an electrostatic precipitator.

Another object of the invention is to provide for the cleaning of the electrodes of an electrostatic precipitator by causing the dust particles adhering to the electrodes, to be electrostatically repelled therefrom, and by causing the repelled dust particles to be drawn from the space between the electrodes.

The invention will now be described with reference to the drawing, of which:

Figure 1:
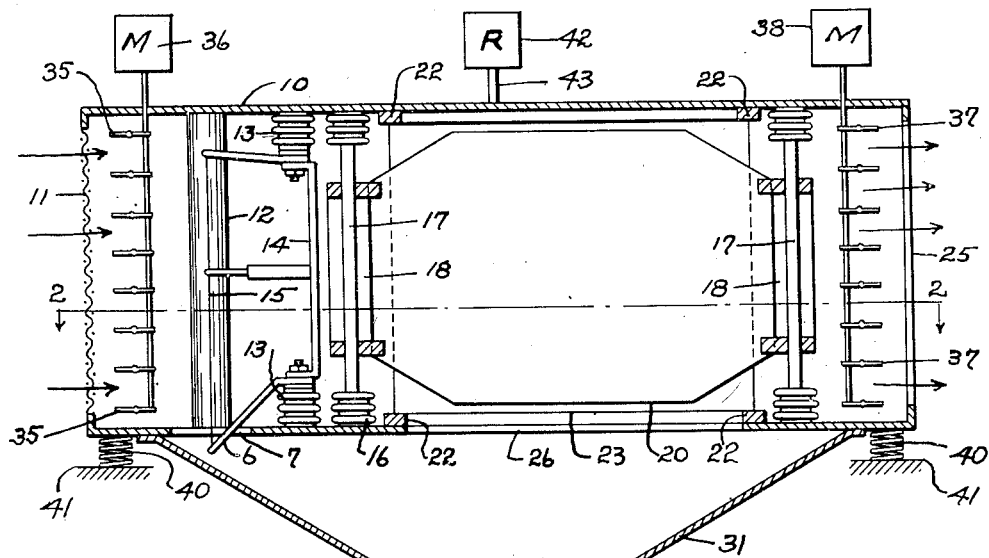
Fig. 1 is a side elevation, partially in section, of an electrostatic precipitator embodying this invention.
Figure 2:
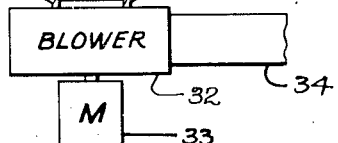
Fig. 2 is a sectional view along the lines 2—2 of Fig. 1.
Figure 2:
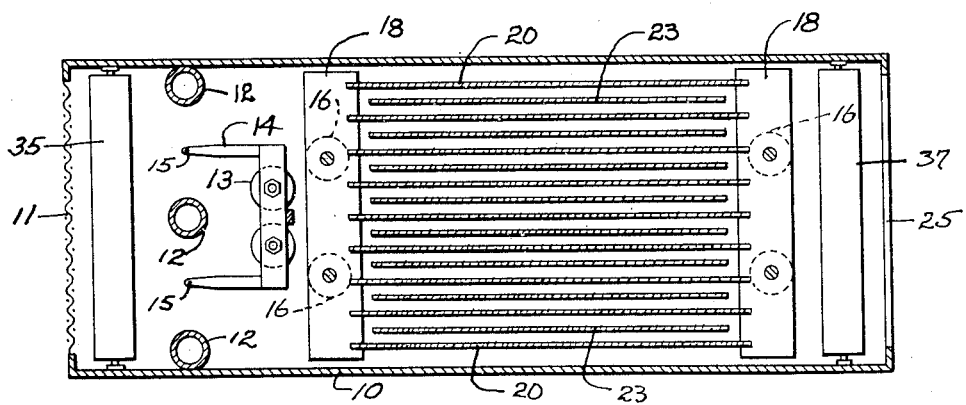

The sheet metal casing 10 has a gas inlet opening 11 adjacent which are supported the spaced, vertically extending, tubular, ionizer electrodes 12 which are grounded to the casing 10. The electric insulators 13 support the framework 14 from the casing 10, the vertically extending ionizer wires 15 being supported between the electrodes 12 by the arms 6 extending from the framework 14. The lower arms 6 extend through the openings 7 in the lower wall of the casing. The lower ends of the tubular electrodes 12 extend into the openings 8 in the lower wall of the casing, being supported therefrom by the spaced arms 9.

The electric insulators 16 support the bars 17 from the casing 10, the slotted supports 18 being attached to the bars 17. The insulated, ungrounded, collector plates 20 are supported in equally spaced slots in the supports 18.

The metal, slotted supports 22 are attached mechanically and electrically to the upper and lower walls of the casing, and the grounded, metal, collector plates 23 are supported in equally spaced slots in the supports 22.

The casing 10 has a gas outlet 25, the gas to be cleaned being passed through the casing as illustrated by the horizontal arrows of Fig. 1 of the drawing. A conventional electric fan which is not illustrated, would be used to provide the pressure necessary for the gas flow.

The casing 10 has the opening 26 in its lower wall below the collector electrodes 20 and 23. The hopper 31 is attached to the casing and extends below the openings 7, 8 and 26 so as to receive the dust dislodged from the ionizer and collector electrodes and falling through these openings.

The outlet of the hopper 31 has the inlet of the fan 32 connected thereto, the fan being driven by the electric motor 33. The outlet of the fan is connected by the duct 34 to a suitable location for the disposal of the dust blown from the fan.

The dampers 35 extend across the inlet opening 11 of the casing, and are adjustable by the motor 36 to close the inlet for preventing the entry of gas therethrough when the fan 32 is operated as will be described.

The dampers 37 extend across the outlet 25 of the casing, and are adjustable by the motor 38 to close the outlet for preventing gas being drawn therethrough into the casing when the fan is operated.

The casing 10 is supported upon the coil springs 40 which in turn, are supported upon the fixed supports 41. The electromagnetic vibrator or rapper 42 has the plunger 43 attached to the casing for vibrating or rapping same and the electrodes supported therefrom, as will be described.

Figure 6:
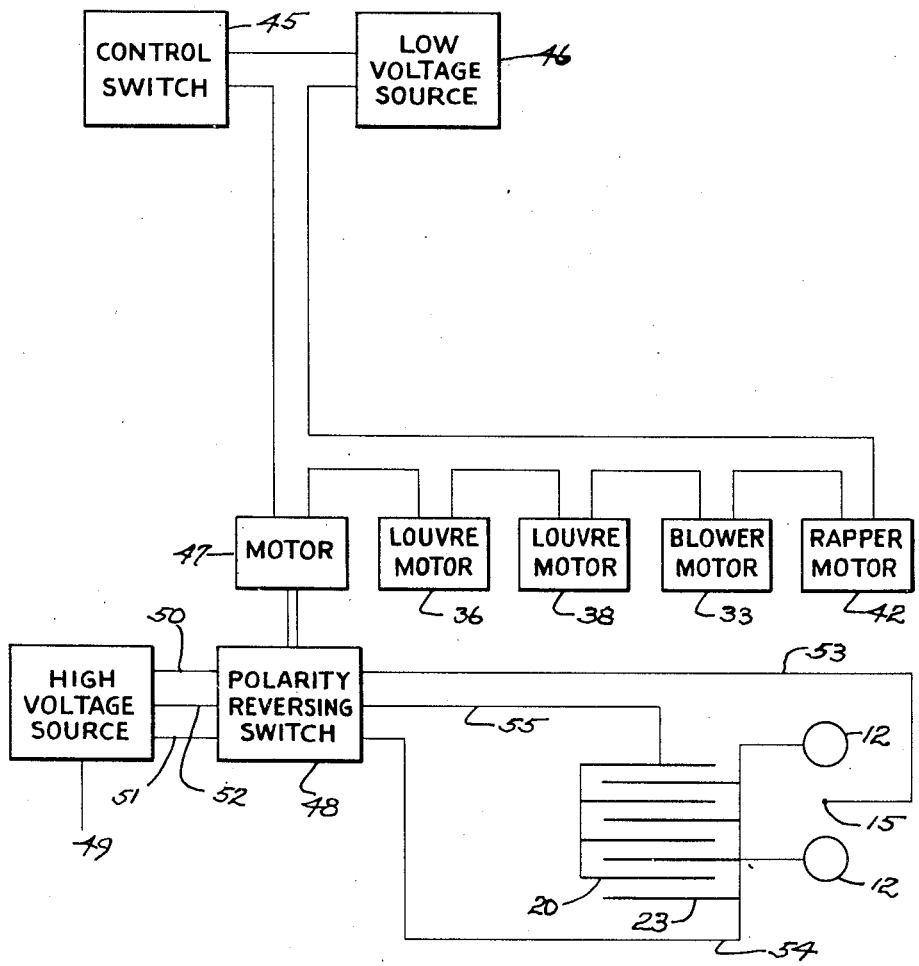
Fig. 6 is a circuit schematic illustrating the controls which are actuated at the start of the cleaning period.

Referring now to Fig. 6, the control switch 45 is connected in series with the low voltage source 46, the motor 47 for operating the polarity reversing switch 48, the damper motors, the fan motor 33, and the vibrator or rapper 42.

The high voltage source 49 is a conventional, high voltage, direct current, supply source supplying a direct current voltage which may be 12,000 volts, through the leads 50 and 52 to the polarity reversing switch 48, and providing a direct current voltage which may be 6,000 volts through the leads 51 and 52 to the switch 48. The switch 48 supplies 12,000 volts through the leads 53 and 54, between the ionizer wires 15 and the tubular ionizer electrodes 12, the latter normally being grounded. The wires 15 normally are positive, and the electrodes 12 normally are negative as are the collector plates 23. The switch 48 also supplies 6,000 volts through the leads 54 and 55 between the collector plates 20 and 23, the plates 20 normally being positive, and the plates 23 normally being negative.

When the switch 48 is actuated by the motor 47, it reverses the polarity of the voltage applied to the electrodes 20 and 23 whereby the normally positive plates 20 become negatively charged, and the normally negative plates 23 become positively charged. At the same time the supply of current through the lead 53 to the ionizer wires is discontinued. At this time the tubular, ionizer electrodes become positively charged since connected to the collector plates 23.

After a period of operation of the precipitator, the length of the period depending upon the dust density in the gas being treated, the switch 45 is closed to start the cleaning of the electrodes. The switch 45 may be manually closed, or may be operated by a conventional clock control. When the switch 45 is closed, the dampers 35 and 37 are closed by the motors 36 and 38 respectively; the motor 33 starts the fan 32; the motor 47 starts to actuate the switch 48, and the vibrator 42 begins to vibrate or rap the casing 10.

The fan 32 creates a negative pressure within the casing, sufficient to cause any dust in the space between the collector electrodes and loosely adhering thereto, to be drawn into the inlet of the fan.

The operation of the switch 48 by the motor 47 starts the polarity reversing cycles whereby the dust electrostatically adhering to the collector plates is repelled thereby into the space between the plates, and is drawn into the fan.

Figure 3:
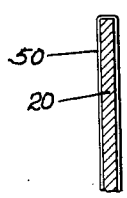
Fig. 3 is an enlarged fractional view in cross-section, of one of the collector electrodes.
Figure 4:
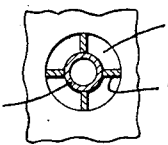
Fig. 4 is a sectional view of the support for the lower end of the central, tubular, ionizer electrode.
Figure 5:
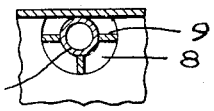
Fig. 5 is a sectional view of the support for one of the outer, tubular, ionizer electrodes.

The plates 20 and 23 are coated as illustrated by Fig. 3 by coatings of electric insulating material 50 of low electrical conductivity such as one of the synthetic resins used for electric insulation. The insulating coatings on the plates are for preventing the electrostatically charged dust particles attracted to the collector electrodes from losing their charges. The dust will adhere to the coatings due to the attraction exerted by the plates, and when the polarity of the plates is reversed, the dust will be repelled from the coatings so as to attempt to jump across the gaps between the electrodes, some at least of such dust being drawn into the inlet of the fan. The dust which gets across the gaps between the electrodes will adhere to the plates now having the opposite charges, and will be repelled by such plates on the next polarity reversal. On each polarity reversal more of the dust will be drawn into the fan, and that adhering to the electrodes after jumping the gaps between same, will adhere to lower portions of the plates on each polarity reversal due to being drawn downwardly by the suction of the fan. Finally all of the dust adhering to the collector plates through electrostatic action, will be drawn into the fan.

Upon the charge being removed from the ionizer wires 15 by the switch 48, the dust adhering thereto will slide down the wires into the hopper, the suction of the fan, and the vibration caused by the vibrator 42 being sufficient to cause this. The dust adhering to the tubular ionizer electrodes 12, which also may be coated with the insulating material, will be repelled thereby when their polarity is reversed by the switch 48, and being subject to the suction of the fan, and the vibration of the vibrator 42, will slide down the electrodes 12 or will be drawn therefrom into the fan. The dust sliding down the tubular electrodes 12 will pass through the openings 8 in the lower wall of the casing into the hopper and then will be drawn into the fan.

Through moisture or chemical action, some dust may tend to adhere to the electrodes despite the reversal of polarity. The vibrator 42 will cause such dust to lose its mechanical or chemical adherance so as to be subjected to repulsion from the electrodes when their polarity is reversed. The suction of the fan will also aid in the removal of dust adhering to the electrodes.

The motor 47 would actuate the switch 48 to frequently reverse the polarity of each collector electrode, whereby each would alternately be charged positive and negative. Thus the plates 20 would be charged positively and then negatively and then positively again and so on, while the plates 23 would be charged negatively, then positively, then negatively and so on.

At the end of the cleaning period, the switch 45 would be opened to restore the precipitator to normal operation.

While one embodiment of the invention has been described for the purpose of illustration, it should be understood that the invention is not limited to the exact apparatus and arrangement illustrated, as modifications thereof may be suggested by those skilled in the art, without departure from the essence of the invention.

What is claimed is:

1. An electrostatic precipitator comprising a casing having a gas inlet and a gas outlet, with dampers therein, and containing a plurality of spaced, vertically extending, collector electrodes, said casing having a sump formed below said electrodes, a blower having its inlet connected to the interior of said sump so as to draw foreign particles therefrom, means for applying an electric charge of one polarity to alternate of said electrodes, and a charge of the opposite polarity to the others of the electrodes, and means for reversing the polarities of the charges applied to the electrodes, for closing said dampers, and for starting said blower.

2. An electrostatic precipitator as claimed in claim 1 in which the electrodes are electric conductors having coatings of electric insulation thereon.

3. An electrostatic precipitator comprising a casing having a gas inlet and a gas outlet, means for closing said inlet and outlet against the passage of gas therethrough, a plurality of spaced collector electrodes of electric conducting material in said casing, said electrodes having coatings of electric insulation thereon, said casing having a sump below said electrodes, a blower having its inlet connected to the interior of the sump, a motor for driving said blower, means for applying an electric charge of one polarity to alternate of said electrodes and of the opposite polarity to the others of said electrodes, polarity reversing means for reversing the polarities of the charges applied to the electrodes, and coordinated means for actuating said first mentioned means, said motor and said polarity reversing means.

4. An electrostatic precipitator as claimed in claim 3 in which means is provided for vibrating the electrodes and which is actuated by the coordinated means.

ROBERT T. PALMER.

REFERENCES CITED

The following references are of record in the file of this patent:

UNITED STATES PATENTS

| Number | Name | Date |
|---|---|---|
| 913,941 | Blake | Mar. 2, 1909 |
| 1,790,147 | Heinrich | Jan. 27, 1931 |
| 2,351,089 | Abbey | June 13, 1944 |
| 2,391,863 | Bowen | Jan. 1, 1946 |

FOREIGN PATENTS

| Number | Country | Date |
|---|---|---|
| 339,625 | Germany | July 29, 1921 |